(12) United States Patent
Anderson et al.

(10) Patent No.: US 8,081,182 B2
(45) Date of Patent: Dec. 20, 2011

(54) DEPTH BUFFER FOR RASTERIZATION PIPELINE

(75) Inventors: Michael Hugh Anderson, Leucadia, CA (US); Ann Chris Irvine, Bonsall, CA (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 10/983,184

(22) Filed: Nov. 4, 2004

(65) Prior Publication Data

US 2005/0195199 A1    Sep. 8, 2005

Related U.S. Application Data

(60) Provisional application No. 60/550,024, filed on Mar. 3, 2004.

(51) Int. Cl.
*G06T 15/40* (2011.01)

(52) U.S. Cl. .. 345/422; 345/421; 711/167; 365/189.011

(58) Field of Classification Search .......... 345/418–419, 345/421–422; 711/167; 365/189.011
See application file for complete search history.

(56) References Cited

U.S. PATENT DOCUMENTS

| | | | | |
|---|---|---|---|---|
| 4,924,415 A | * | 5/1990 | Winser | 345/422 |
| 5,353,410 A | * | 10/1994 | Macon et al. | 711/144 |
| 5,517,603 A | * | 5/1996 | Kelley et al. | 345/426 |
| 5,596,686 A | * | 1/1997 | Duluk, Jr. | 345/422 |
| 5,636,355 A | * | 6/1997 | Ramakrishnan et al. | 711/113 |
| 5,764,228 A | | 6/1998 | Baldwin | |
| 5,798,770 A | | 8/1998 | Baldwin | |
| 5,844,571 A | * | 12/1998 | Narayanaswami | 345/422 |
| 5,850,224 A | | 12/1998 | Sakuraba | |
| 5,896,134 A | * | 4/1999 | Hashimoto | 345/422 |
| 5,903,916 A | * | 5/1999 | Pawlowski et al. | 711/167 |
| 6,084,823 A | * | 7/2000 | Suzuki et al. | 365/230.03 |
| 6,112,265 A | * | 8/2000 | Harriman et al. | 710/40 |
| 6,118,452 A | * | 9/2000 | Gannett | 345/418 |
| 6,119,205 A | * | 9/2000 | Wicki et al. | 711/143 |
| 6,154,223 A | * | 11/2000 | Baldwin | 345/506 |
| 6,172,678 B1 | * | 1/2001 | Shiraishi | 345/419 |
| 6,222,550 B1 | | 4/2001 | Rosman et al. | |
| 6,339,432 B1 | | 1/2002 | Grossman | |
| 6,348,919 B1 | | 2/2002 | Murphy | |
| 6,408,325 B1 | * | 6/2002 | Shaylor | 718/108 |

(Continued)

FOREIGN PATENT DOCUMENTS

JP          9319892          12/1997

(Continued)

OTHER PUBLICATIONS

Huang, J.: "Advanced OpenGL Technique", Online, Dec. 31, 2002, pp. 1-11, XP002337291.

(Continued)

*Primary Examiner* — Daniel Washburn
(74) *Attorney, Agent, or Firm* — Timothy F. Loomis; James R. Gambale, Jr.

(57) ABSTRACT

By locating the depth buffer of a 3D graphics rasterization pipeline in a dedicated high speed memory, bandwidth on a main bus can be eliminated that would otherwise result from hidden surface removal (HSR) hardware contained in the pipeline. Also, by reordering of read and write access commands to the depth buffer memory, it is possible to improve memory access throughput otherwise impacted by an increased latency of a read access.

21 Claims, 6 Drawing Sheets

U.S. PATENT DOCUMENTS

| | | | |
|---|---|---|---|
| RE38,078 E * | 4/2003 | Duluk, Jr. | 345/422 |
| 6,556,197 B1 * | 4/2003 | Van Hook et al. | 345/419 |
| 6,622,227 B2 * | 9/2003 | Zumkehr et al. | 711/167 |
| 6,636,214 B1 | 10/2003 | Leather | |
| 6,636,226 B2 | 10/2003 | Morein et al. | |
| 6,756,986 B1 * | 6/2004 | Kuo et al. | 345/531 |
| 6,891,533 B1 | 5/2005 | Alcorn | |
| 6,894,689 B1 * | 5/2005 | Greene et al. | 345/422 |
| 6,901,494 B2 * | 5/2005 | Zumkehr et al. | 711/167 |
| 6,961,057 B1 * | 11/2005 | Van Dyke et al. | 345/422 |
| 6,980,208 B1 * | 12/2005 | Montrym et al. | 345/422 |
| 7,091,971 B2 * | 8/2006 | Morein | 345/422 |
| 7,173,631 B2 * | 2/2007 | Anderson | 345/611 |
| 7,301,537 B2 * | 11/2007 | Strom et al. | 345/422 |
| 2002/0083287 A1 * | 6/2002 | Zumkehr et al. | 711/167 |
| 2003/0080963 A1 * | 5/2003 | Van Hook et al. | 345/501 |
| 2004/0015650 A1 * | 1/2004 | Zumkehr et al. | 711/167 |
| 2004/0128428 A1 * | 7/2004 | Christenson | 711/5 |
| 2004/0169651 A1 * | 9/2004 | Everitt et al. | 345/426 |
| 2005/0195200 A1 * | 9/2005 | Chuang et al. | 345/519 |
| 2006/0146049 A1 * | 7/2006 | Pulli et al. | 345/421 |

FOREIGN PATENT DOCUMENTS

| | | |
|---|---|---|
| JP | 11066340 | 3/1999 |
| JP | 11149569 | 6/1999 |
| JP | 11306385 | 11/1999 |
| JP | 2000149052 | 5/2000 |
| JP | 2001052198 | 2/2001 |
| JP | 2001222712 | 8/2001 |
| JP | 2002269583 | 9/2002 |
| RU | 2001118221 | 5/2003 |
| RU | 2001126577 | 7/2003 |
| WO | WO0028482 A1 | 5/2000 |
| WO | 0049574 | 8/2000 |

OTHER PUBLICATIONS

Kirk, D.: "Unsolved Problems and Opportunities for High-quality, High-performance 3-D Graphics on a PC Platform", Eurographics/Siggraph Graphics Hardware Workshop, Online, pp. 1-68 (Aug. 1998).

Park, W. et al: "An Effective Pixel Rasterization Pipeline Architecture for 3D Rendering Processors", IEEE Transactions on Computers, vol. 52, No. 11, pp. 1501-1508 (Nov. 2003).

Psarge: "3dMark2001SE-Nature Test with AA", Online, pp. 1-6, (Nov. 2002) XP002337292.

Yu, C. et al: "An Adaptive Spatial Filter for Early Depth Test", IEEE, pp. 137-140 (2004).

* cited by examiner

DEPTH BUFFER FOR RASTERIZATION PIPELINE

CROSS-REFERENCE TO RELATED APPLICATION(S)

A claim of priority is made to U.S. provisional application Ser. No. 60/550,024, filed Mar. 3, 2004, the entire contents of which are incorporated herein by reference.

BACKGROUND OF THE INVENTION

1. Field of the Invention

The present invention generally relates to graphics processors, and more particularly, the present invention relates to the depth buffer utilized in a 3D graphics pipeline.

2. Description of the Related Art

Graphics engines have been utilized to display three-dimensional (3D) images on fixed display devices, such as computer and television screens. These engines are typically contained in desk top systems powered by conventional AC power outlets, and thus are not significantly constrained by power-consumption limitations. A recent trend, however, is to incorporate 3D graphics engines into battery powered hand-held mobile devices. Examples of such devices include mobile phones and personal data assistants (PDAs). Unfortunately, however, conventional graphics engines consume large quantities of power and are thus not well-suited to these low-power operating environments.

FIG. 1 is a schematic block diagram of a basic Open GL rasterization pipeline contained in a conventional 3D graphics engine. As shown, the rasterization pipeline of this example includes a triangle setup stage 101, a pixel shading stage 102, a texture mapping stage 103, a texture blending stage 104, a scissor test stage 105, an alpha test stage 106, a stencil test stage 107, a hidden surface removal (HSR) stage 108, an alpha blending stage 109, and a logical operations stage 110.

In 3D graphic systems, each object to be displayed is typically divided into surface triangles defined by vertex information, although other primitive shapes can be utilized. Also typically, the graphics pipeline is designed to process sequential batches of triangles of an object or image. The triangles of any given batch may visually overlap one another within a given scene.

Referring to FIG. 1, the triangle setup stage 101 "sets up" each batch of triangles by computing coefficients to be used in computations executed by later pipeline stages.

The pixel shading stage 102 uses the vertex information to compute which pixels are encompassed by each triangle among a processed batch of triangles. Since the triangles may overlap one another, multiple pixels of differing depths may be located at the same point on a screen display. In particular, the pixel shading stage 101 interpolates the shading (lighting value), color and depth values for each pixel using the vertex information. Any of a variety of shading techniques can be adopted for this purpose, and shading operations can take place on per triangle, per vertex or per pixel bases.

The texture mapping stage 103 and texture blending stage 104 function to add and blend texture into each pixel of the process batch of triangles. Very generally, this is done by mapping pre-defined textures onto the pixels according to the vertex information. As with shading, a variety of techniques may be adopted to achieve texturing. Also, a technique known as fog processing may be implemented as well.

The scissor test stage 105 functions to discard pixels contained in portions (fragments) of triangles which fall outside the field of view of the displayed scene. Generally, this is done by determining whether pixels lie within a so-called scissor rectangle.

The alpha test unit 106 conditionally discards a fragment of a triangle (more precisely, pixels contained in the fragment) based on a comparison between an alpha value (transparency value) associated with the fragment and a reference alpha value. Similarly, the stencil test conditionally discards fragments based on a comparison between each fragments and a stored stencil value.

The HSR stage 108 (also called a depth test stage) discards pixels contained in triangle fragments based on a depth value of the pixels and a depth value of other pixels having the same display location. Generally, this is done by comparing using a z-axis value (depth value) of a pixel undergoing the depth test with a z-axis value stored in a corresponding location of a so-called z-buffer or depth buffer. The tested pixel is discarded if the z-axis value thereof indicates that the pixel would be blocked from view by another pixel having the z-axis value stored in the z-buffer. On the other hand, the z-buffer value is overwritten with the z-axis value of the tested pixel in the case where the tested pixel would not be blocked from view. In the manner, underlying pixels which are blocked from view are discarded in favor of overlying pixels.

The alpha blending stage 109 combines rendered pixels with previously stored in a color buffer based on alpha values to achieve transparency of an object.

The logical operations unit 110 generically denotes miscellaneous remaining processes of the pipeline for ultimately obtaining pixel display data.

In any graphics system, it is desired to conserve processor and memory bandwidth to the extent possible while maintaining satisfactory performance. This is especially true in the case of portable or hand-held devices where bandwidths may be limited. Also, as suggested previously, there is a particular demand in the industry to minimize power consumption when processing 3D graphics for display on portable or hand-held devices.

SUMMARY OF THE INVENTION

According to one aspect of embodiments of the present invention, a data processor is provided which includes a main data bus, a memory interface coupled to the main data bus, and a rasterization pipeline coupled to the main data bus. The rasterization processor includes a plurality of sequentially arranged processing stages which render display pixel data from input primitive object data, and wherein the processing stages include a hidden surface removal (HSR) stage. The data processor further includes a memory which functions as a depth buffer and which is directly coupled to the HSR stage of the rasterization pipeline.

According to another aspect of embodiments of the present invention, a data processor is provided which includes a main data bus and a rasterization pipeline coupled to the main data bus. The rasterization processor includes a plurality of sequentially arranged processing stages which render display pixel data from input primitive object data, and wherein the processing stages include a hidden surface removal (HSR) stage which compares a depth value of a currently processed pixel with a depth value of a previously processed pixel. The data processor further includes memory means for supplying the depth value of the previously processed pixel to the HSR stage of the rasterization pipeline without accessing the main data bus.

According to still another aspect of embodiments of the present invention, a method for processing data is provided which includes transmitting data over a main data bus between a rasterization pipeline and a shared memory interface, where the rasterization pipeline processes pixel data and includes a plurality of sequentially arranged processing stages which render display pixel data from input primitive object data. The method further includes executing a hidden surface removal (HSR) process in the rasterization pipeline which includes accessing a depth buffer memory directly coupled to the rasterization pipeline to retrieve and store depth values of pixels processed by the rasterization pipeline without transmitting the depth values over the main data bus.

According to yet another aspect of embodiments of the present invention, graphics pipeline for processing pixel data is provided which includes a depth buffer which stores depth values, and a hidden surface removal (HSR) stage which issues a read access request and a read data request to the depth buffer to compare a current depth value of a processed pixel with a previous depth value stored in the depth buffer, and which issues a write access request to the depth buffer to overwrite the previous depth value with the current depth value based on a comparison result. The write access request is issued after the read access request and before the read data request, and during a latency period of the read access request.

According to another aspect of embodiments of the present invention, a graphics pipeline is provided which includes a depth buffer memory operatively connected to a hidden surface removal (HSR) block, and means for temporarily storing a write access request, and then transmitting the write access request to the depth buffer memory during a latency period of a previously transmitted read access request.

According to yet another aspect of embodiments of the present invention, a method is provided of controlling a depth buffer memory operatively connected to a hidden surface removal (HSR) block of a 3D graphics pipeline. The method includes transmitting a read access request to the depth buffer memory, transmitting a write access request to the depth buffer memory after the read access request is transmitted and during a latency period of the read access request, and transmitting a read data request associated with the read access request to the depth buffer memory after transmitting the write access request.

BRIEF DESCRIPTION OF THE DRAWINGS

The above and other aspects of the invention will become readily apparent from the detailed description that follows, with reference to the accompanying drawings, in which.

DETAILED DESCRIPTION OF PREFERRED EMBODIMENTS

Embodiments of the present invention are at least partially characterized by locating the depth buffer of the 3D graphics rasterization pipeline in a dedicated high speed memory. This allows for elimination of bandwidth on a main bus that would otherwise result from hidden surface removal (HSR) hardware contained in the pipeline.

Other embodiments of the present invention are at least partially characterized by reordering of read and write access commands to improve memory access throughput otherwise impacted by an increased latency of a read access.

The present invention will now be described by way of several preferred but non-limiting embodiments.

Three-dimensional (3D) rasterization pipelines utilize a "depth test" to determine whether a newly processed pixel is obscured by a previously rendered pixel. The mechanism involves accessing a "depth buffer" (also called a "z-buffer") into which depth values (i.e., z values) are stored and checked during rasterization. Essentially any visible pixel's distance from the viewer is stored as a depth value in the depth buffer. Subsequently, another processed pixel may attempt to occupy the same position on the screen. The depth value of the previously rendered pixel (i.e., the depth valued stored in the depth buffer at the pixel position) is read and compared with the value of the newly processed pixel. If the comparison result indicates that the new pixel is closer to the viewer, then it is deemed to be visible, and the previous depth value of the depth buffer is overwritten with the depth value of the new pixel. The new pixel is further processed by the pipeline, and eventually rendered in a frame buffer. On the other hand, if the comparison result indicates that the new pixel is farther from the viewer, then it is deemed to be invisible, and the new pixel is discarded and the previous depth value of the depth buffer is maintained. This process is referred to herein as Hidden Surface Removal (HSR).

Figure 1:
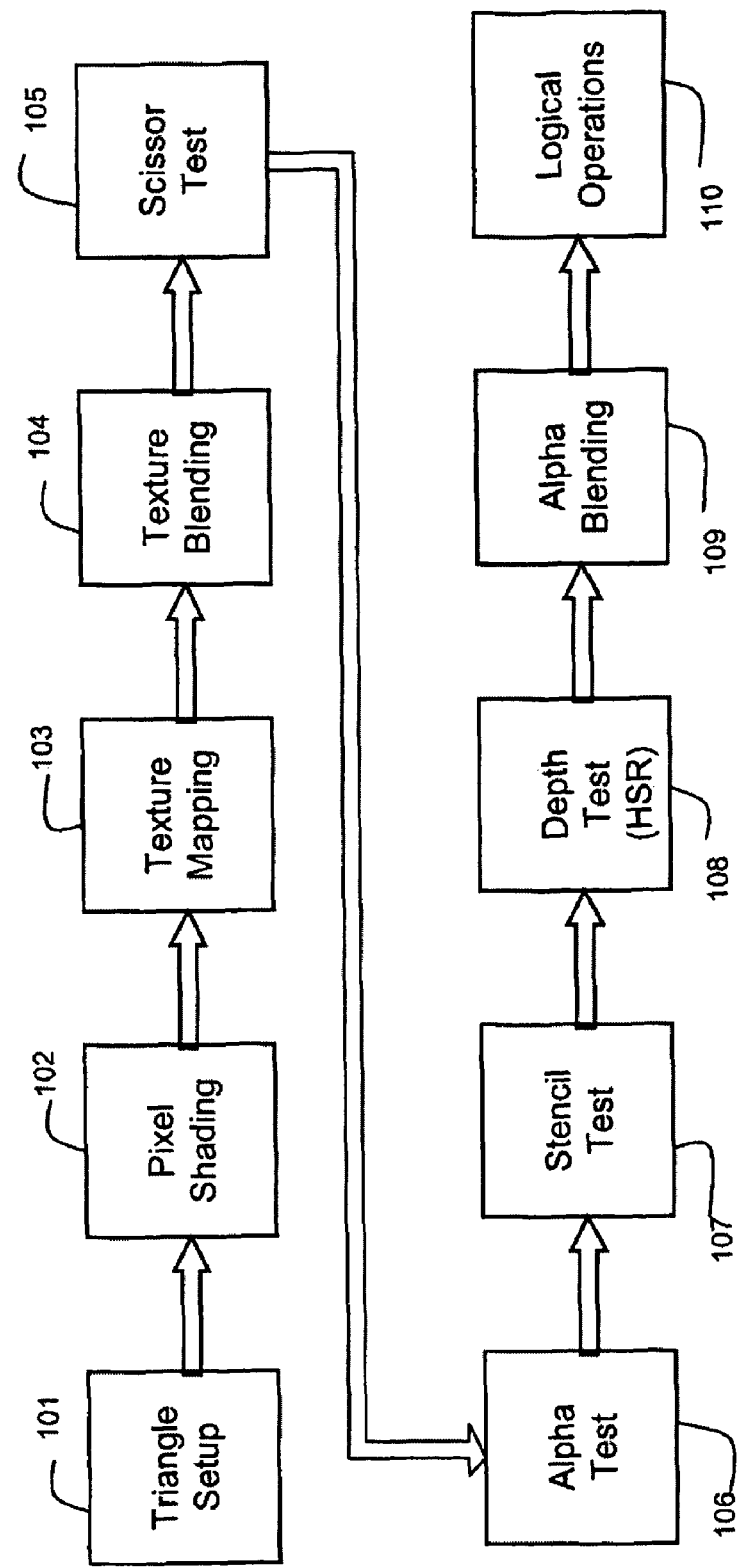
FIG. 1 is a schematic block diagram of an example of a basic Open GL rasterization pipeline contained in a 3D graphics engine.
Figure 2:
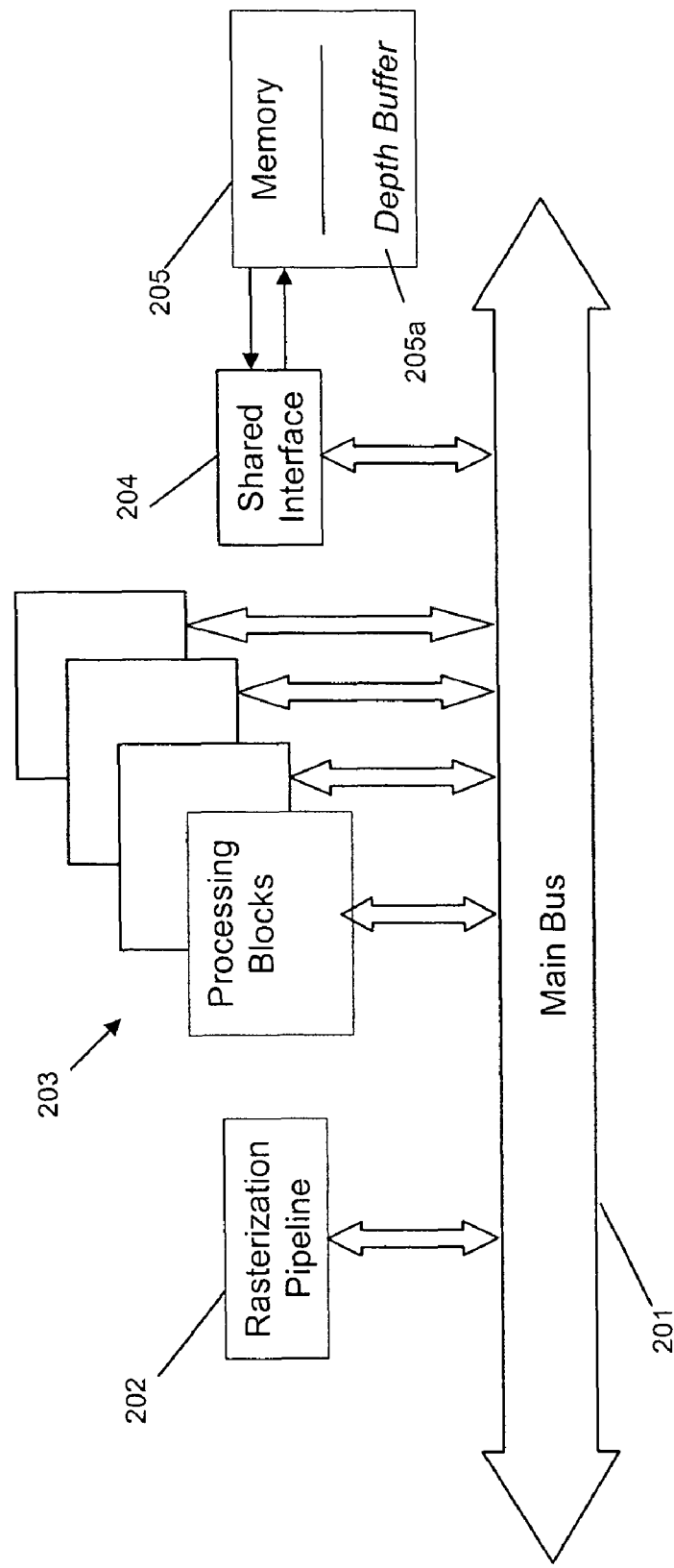
FIG. 2 illustrates a simplified example of a circuit block configuration of a processor contained in a mobile telephone having 3D graphics display capability.

FIG. 2 illustrates a simplified example of a circuit block configuration of a processor contained in a mobile telephone having 3D graphics display capability. The processor is equipped with a main data bus 201 and a rasterization pipeline 202 coupled to the main data bus 201. In addition to the rasterization pipeline 202, the processor contains a number of other functional processing blocks 203 all accessing the main data bus 201. In hand-held applications, where power and space are limited, the processor chip is typically equipped with a single shared memory interface 204 for passing data back and forth between a memory block 205 and the main data bus 201. The depth buffer 205*a* described above is defined within the memory block 205.

The memory bandwidth associated with the depth buffer 205*a* is content dependent, but normally quite significant. Assume, for example, that a hand-held or mobile QVGA screen contains 320 ×240 =76,800 pixels. In one frame, at 20 frames per second, 1,536,00 pixels (20 ×76,800) will be placed on the display Depending on the content, for each pixel placed on the display, several more are actually rendered into the frame buffer, and for each pixel rendered into the frame buffer, there may be pixels which did not pass the depth test. A number which describes screen complexity is the Depth Complexity Factor (DCF). A DCF of "2" means each pixel on the screen was rendered into the frame buffer two times. Conservatively assuming a DCF of 2, then about 3,000,000 pixels are rendered into the frame buffer every second. If one assumes that HSR discards 50% of the pixels it checks, then 6,000,000 pixels are checked by the HSR block each second. For each pixel HSR checks, there is 1 read of the depth buffer 205a. For each pixel that passes the depth test, there is 1 write to the depth buffer 205a. The total is 6,000,000 reads and 3,000,000 writes, all taking place via the main data bus 201. If each depth value or z-value is represented as a 16-bit number, the total bandwidth becomes 18,000,000 bytes per second (18 MB per second).

A DCF of 2 is considered low, and accordingly, it is likely that HSR related memory bandwidth will be even higher. In addition to HSR, texture mapping and color blending associated with the rasterization pipeline 202 can consume similar amounts of bandwidth. Such large bandwidth numbers are typical of 3D rasterization pipelines, but are not typical of mobile device processor chips. As already mentioned, there is usually only one shared memory interface which must service everything in the chip. For example, the interface may be theoretically capable of supplying a total of 150 MB per second using a 32-bit memory, or 75 MB per second using a 16-bit memory. If the rasterization pipeline is allowed one third of the available bandwidth, it might be just possible to get by with 32-bit memory, but it would not be possible to get by with 16-bit memory. In short, the data processing associated with the rasterization processor 202 places a serious strain on the bandwidth limitations of the mobile device processor chip.

Figure 3:
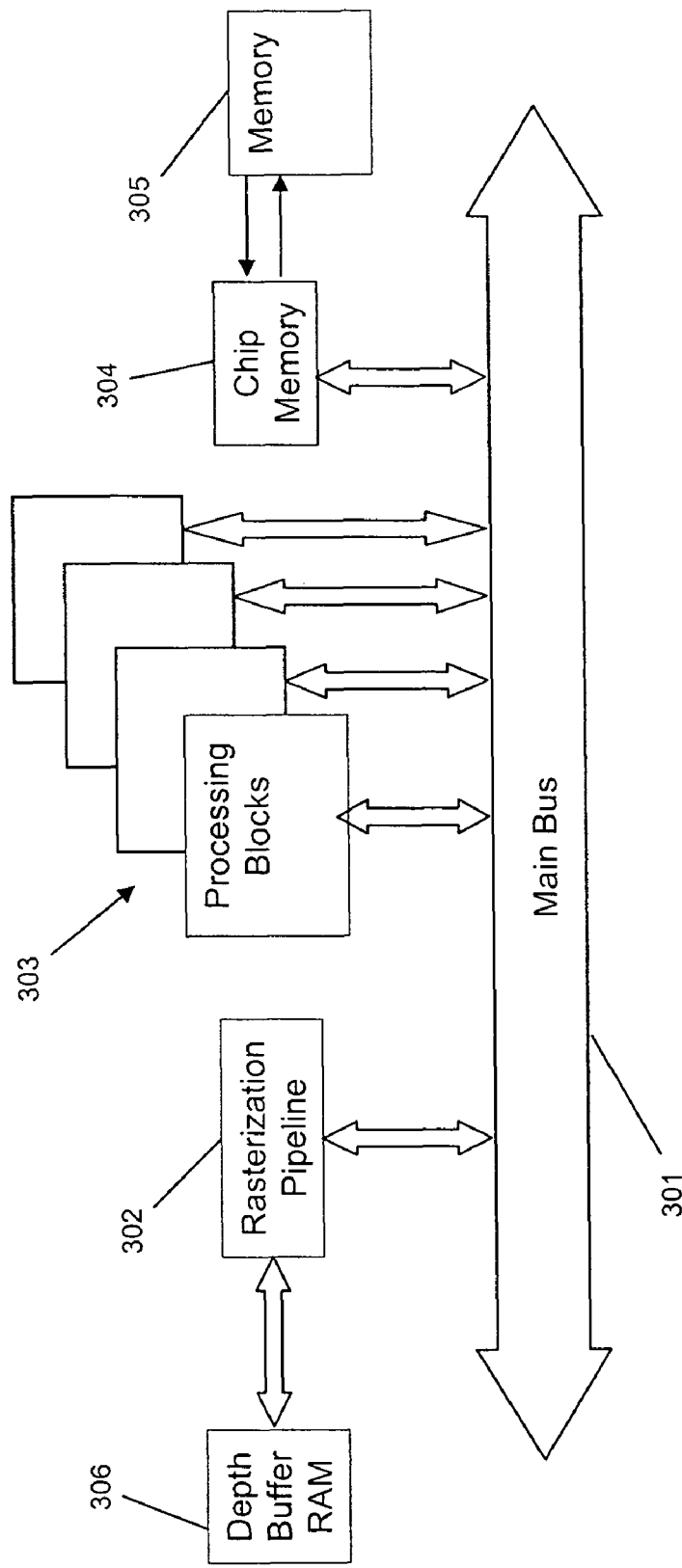
FIG. 3 illustrates a circuit block configuration of a processor according to an embodiment of the present invention.

FIG. 3 illustrates a circuit block configuration of a processor according to an embodiment of the present invention. The processor may be configured on a single chip, and may be contained in a portable hand-held appliance, such as a mobile telephone having 3D graphics display capability. The processor is equipped with a main data bus 301 and a rasterization pipeline 302 coupled to the main data bus 301. In addition to the rasterization pipeline 302, the processor contains a number of other functional processing blocks 303 all accessing the main data bus 301. In the case where the processor is equipped in a mobile telephone, a single shared memory interface 304 may be utilized to minimize power and space consumption. The shared memory interface 304 passes data back and forth between a memory block 305 and the main data bus 301. In addition, the processor of FIG. 3 is equipped with a high speed random access memory (RAM) 306 that is connected to the rasterization pipeline 302. In this embodiment, the RAM 306 is dedicated to function as the depth buffer associated with HSR function of the rasterization pipeline 302. As illustrated, the dedicated RAM 306 is directly coupled to the rasterization pipeline 302. Herein, "directly coupled" means that connection is not via the main data bus 301, and does not exclude the possibility of one or more interface circuits operatively positioned between the RAM 306 and the rasterization pipeline 302. Assuming again that a hand-held or mobile QVGA screen contains 320×240=76, 800 pixels, and that each depth value or z-value is represented as a 16-bit number, the size of the RAM 306 may, for example, be 153,600 bytes.

Figure 4:
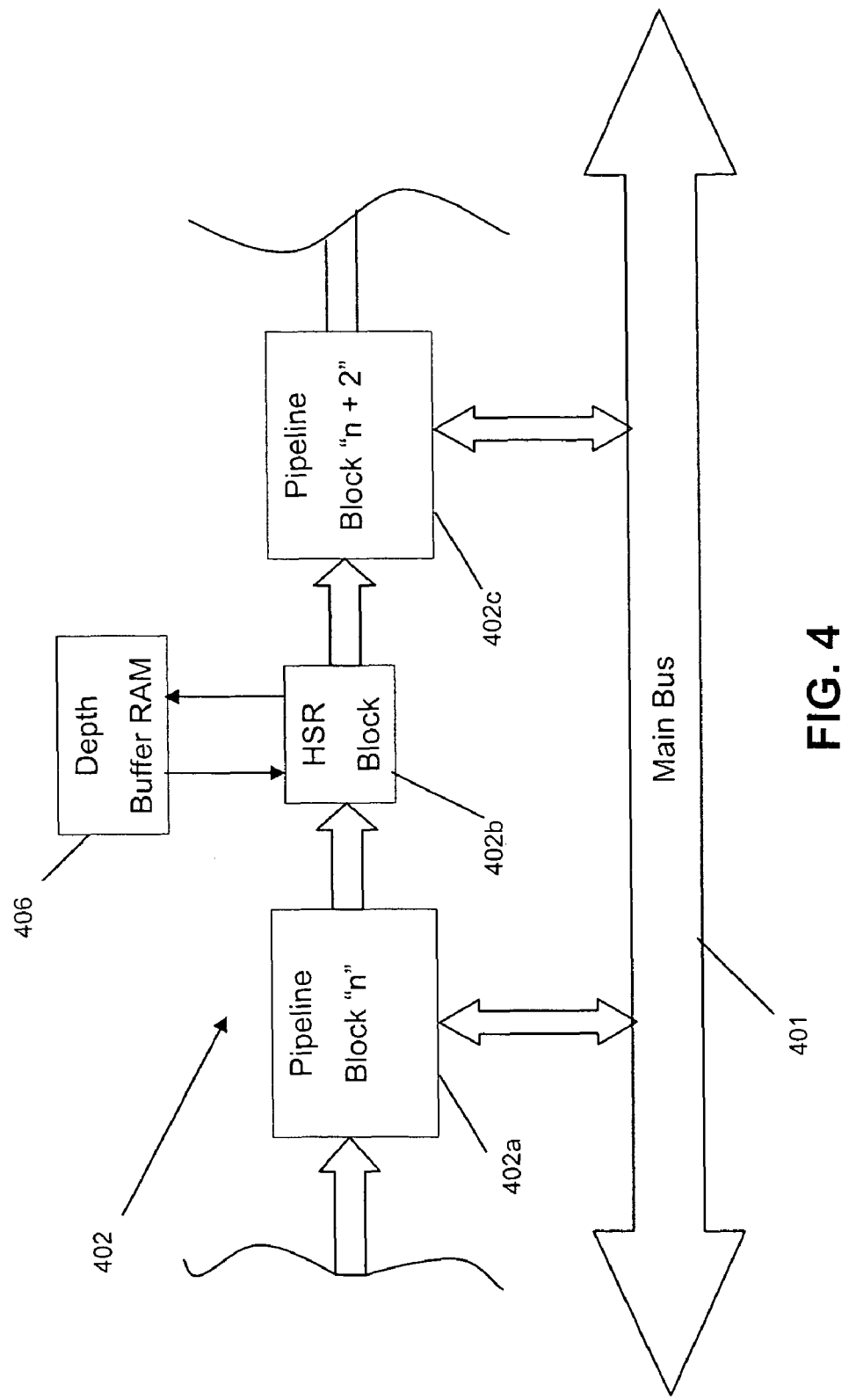
FIG. 4 illustrates a circuit block configuration of the connection of a rasterization processor to a RAM and a main data bus according to an embodiment of the present invention.

FIG. 4 illustrates a circuit block configuration of the connection of the rasterization processor 402 to the RAM 406 and the main data bus 401. As shown, the HSR block 402b of the pipeline 402 passes data back and forth directly with the RAM 406. On the other hand, other pipeline blocks 402a and 402c access the shared memory interface (304 of FIG. 3) via the main data bus 401.

In the configurations of FIGS. 3 and 4, the entire depth buffer is located in a high speed RAM dedicated for this purpose. This approach allows for a significant increase in performance in a system (such as a mobile phone system) that inherently has limited memory bandwidth. As discussed above, a large percentage of memory bandwidth is produced by the HSR hardware block of the rasterization pipeline. Moving the depth buffer to dedicated memory completely eliminates this bandwidth on the main data bus.

Figure 5:
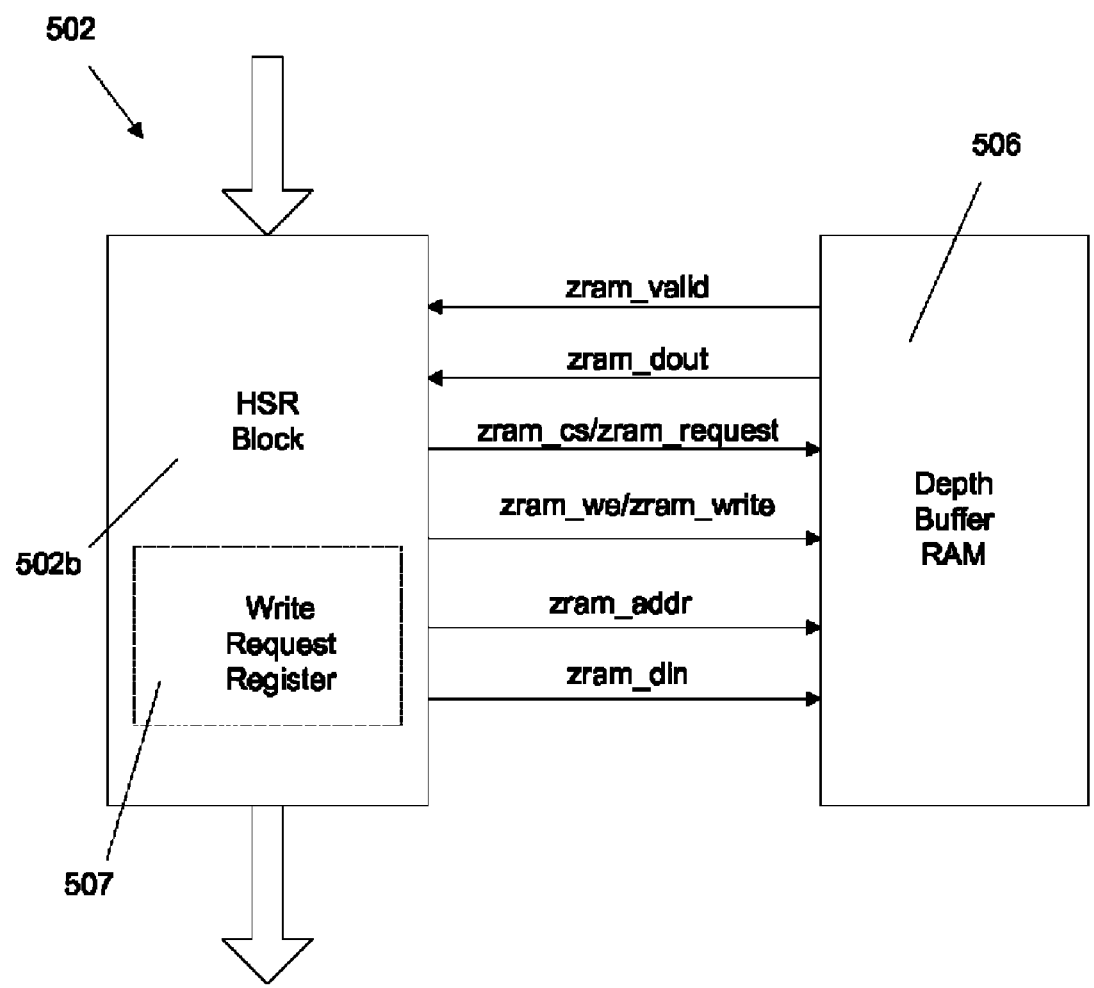
FIG. 5 is a view depicting an HSR block of a rasterization pipeline coupled to a depth buffer RAM according to another embodiment of the present invention.

FIG. 5 is another view depicting a HSR block 502b of a rasterization pipeline 502 coupled to a depth buffer RAM 506 according to another embodiment of the present invention. In this figure, "zram_cs/zram_request" and "zram_we/zram_write" are control signals issued by the HSR block 502b for controlling read and write operations of the depth buffer RAM 506. A RAM address signal is denoted as "zram_addr". Data which is output (read) from the RAM 506 is denoted as "zram_dout", and data which is input (written) to the RAM 506 is denoted as "zram_din". "zram_valid" is a single-bit line which is held to a given state when zram_dout is outputting valid data. In this embodiment, the HSR block 502b is equipped with, or has access to, a write request register 507, the operation of which will be explained below.

The depth buffer RAM 506 has a latency of two cycles for read access and one cycle for read data. Accordingly, three clock cycles are needed for the HSR block 502 to access and read data (depth values) from the depth buffer RAM 506. In the meantime, the depth buffer RAM 506 has a latency of one cycle for write access, and therefore one clock cycle is needed to write data (depth values) into the depth buffer RAM 506. Thus, a normally ordered access (read access (two cycles)→read data (one cycle)→write access (one cycle)→) can negatively impact performance of the rasterization pipeline due to increased read access latency.

The present embodiment overcomes this drawback as follows. When a write to the memory is requested by the HSR block 502b, the request is deferred and temporarily stored in the register 507 shown in FIG. 5, until a read access request is issued. The write access is then sent out immediately after the read access request. As such, there is no additional memory access required for the write operation.

Figure 6:
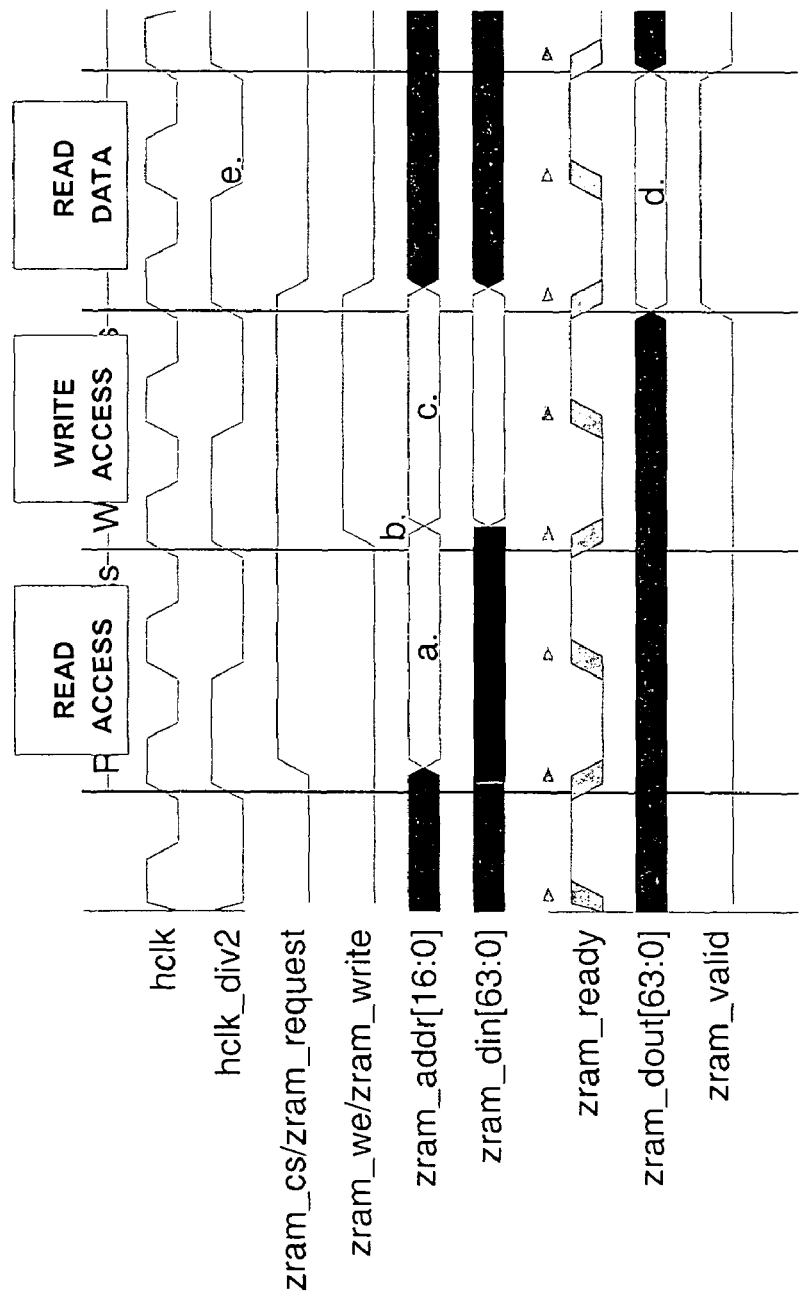
FIG. 6 is a timing diagram for explaining read and write operations of a depth buffer RAM according to an embodiment of the present invention.

This is illustrated in the timing diagram example of FIG. 6. In this figure, "hclk" is a clock signal, and "hclk_div2" is a divided clock signal. The signal "zram_ready" denotes a ready state of the depth buffer RAM 506 and transitions to a high state during each falling transition of the divided clock signal hclk_div2.

A read access command is generated when the signal zram_cs/zram_request transitions to a high state while the signal zram_we/zram_write is held low. In a non-reordered access scheme, a read data command would then be issued after waiting one clock cycle. However, according to the present embodiment, a previously deferred write access command is issued immediately after the read access request. This write command is generated when the signal zram_we/zram_write transitions to a high state while the signal zram_cs/zram_request is held high. As a result, the data zram_din is written into the RAM 506. Then, a read data command is issued when the signals zram_cs/zram_request and zram_we/zram_write are transitioned to a low state. At this time, the data zram_dout is output from the RAM 506.

A flush provision may optionally be adopted to unconditionally write without waiting for the read access in case data coherency is important.

This embodiment of the present invention effectively overcomes the problem of latency impacting memory throughput by performing a "lazy" write-back, i.e., pending writes are delayed until a read request comes in, and the write access is piggybacked after the read access, thus effectively improving the memory access throughput. Thus, in a graphics pipeline, the only bandwidth impact is due to read operations.

In the drawings and specification, there have been disclosed typical preferred embodiments of this invention and, although specific examples are set forth, they are used in a generic and descriptive sense only and not for purposes of limitation. It should therefore be understood the scope of the present invention is to be construed by the appended claims, and not by the exemplary embodiments.

What is claimed is:

1. An apparatus comprising:
a processor configured to:
receive a write request associated with a write command, wherein the write command, when executed, causes first data to be written to a depth buffer;
issue a read access command to enable the processor to access second data at the depth buffer, wherein the read access command is issued after the write request is received;
execute the write command unconditionally as a next sequential action following issuance of the read access command; and
execute a read command after completion of the write command, wherein the read command, when executed, causes the second data to be read from the depth buffer.

2. The apparatus of claim 1, wherein the read command is executed unconditionally as the next sequential action following completion of the write command.

3. The apparatus of claim 1, wherein the first data is associated with a graphic pixel value.

4. The apparatus of claim 3, wherein when the first data is written to the depth buffer the first data overwrites third data associated with a previous graphical pixel value.

5. The apparatus of claim 1, wherein the second data is associated with a graphic pixel value.

6. The apparatus of claim 1, wherein the first data and the second data include a same number of data bits.

7. The apparatus of claim 1, wherein the depth buffer includes a random access memory (RAM).

8. The apparatus of claim 7, wherein the RAM is dedicated to storing data associated with depth values of graphic pixels.

9. The apparatus of claim 7, wherein the RAM is directly coupled to a rasterization pipeline.

10. The apparatus of claim 1, wherein executing the write command comprises writing the first data to a first location within the depth buffer, and wherein the write command is executed independent of a second location of the second data within the depth buffer.

11. The apparatus of claim 1, wherein the write command, when executed, causes the first data to be written to a first location within the depth buffer.

12. The apparatus of claim 11, wherein the second data is associated with a second location within the depth buffer, wherein the second location is distinct from the first location.

13. The apparatus of claim 1, wherein the processor is included in a rasterization pipeline.

14. The apparatus of claim 1, wherein the processor is further configured to defer execution of the write command until the read access command is issued.

15. A processor comprising:
means for receiving a write access command, wherein the write command, when executed, causes first data to be written to a depth buffer;
means for issuing a read access command after receiving the write access command, wherein the read access command, when executed, enables the processor to access second data stored in the depth buffer;
means for executing the write command unconditionally as a next sequential action following issuance of the read access command; and
means for executing a read command after completion of the write command, wherein the read command, when executed, causes the second data to be read from the depth buffer.

16. The processor of claim 15, wherein the read command is executed as the next sequential action following completion of the write command.

17. A method comprising:
receiving a write request associated with a write command and deferring execution of the write command until receipt of a read operation request, wherein the write command, when executed, causes first data to be written to a depth buffer;
issuing a read access command in response to the read operation request to enable a processor to access second data at the depth buffer, wherein the read access command is issued after the write request is received;
executing the write command unconditionally as a next sequential action following issuance of the read access command; and
executing a read command after completion of the write command, wherein the read command, when executed, causes the second data to be read from the depth buffer.

18. The method of claim 17, wherein the write command is executed in response to the issuance of the read access command.

19. The method of claim 17, wherein a read operation associated with the read operation request includes the read access command and the read command, and wherein the write command is piggybacked after the read access command.

20. The method of claim 19, wherein a first number of clock cycles associated with execution of the write command is less than a second number of clock cycles associated with execution of the read operation.

21. A non-transitory computer readable medium storing processor-executable instructions that, when executed by a processor, cause the processor to:
receive a write request associated with a write command, wherein the write command, when executed, causes first data to be written to a depth buffer;
issue a read access command to enable the processor to access second data at the depth buffer, wherein the read access command is issued after the write request is received;
execute the write command unconditionally as a next sequential action following issuance of the read access command; and
execute a read command after completion of the write command, wherein the read command, when executed, causes the second data to be read from the depth buffer.

* * * * *